May 10, 1955 P. O. HOWE 2,707,843
DEVICE FOR PLAYING FISH LURES
Filed May 19, 1954
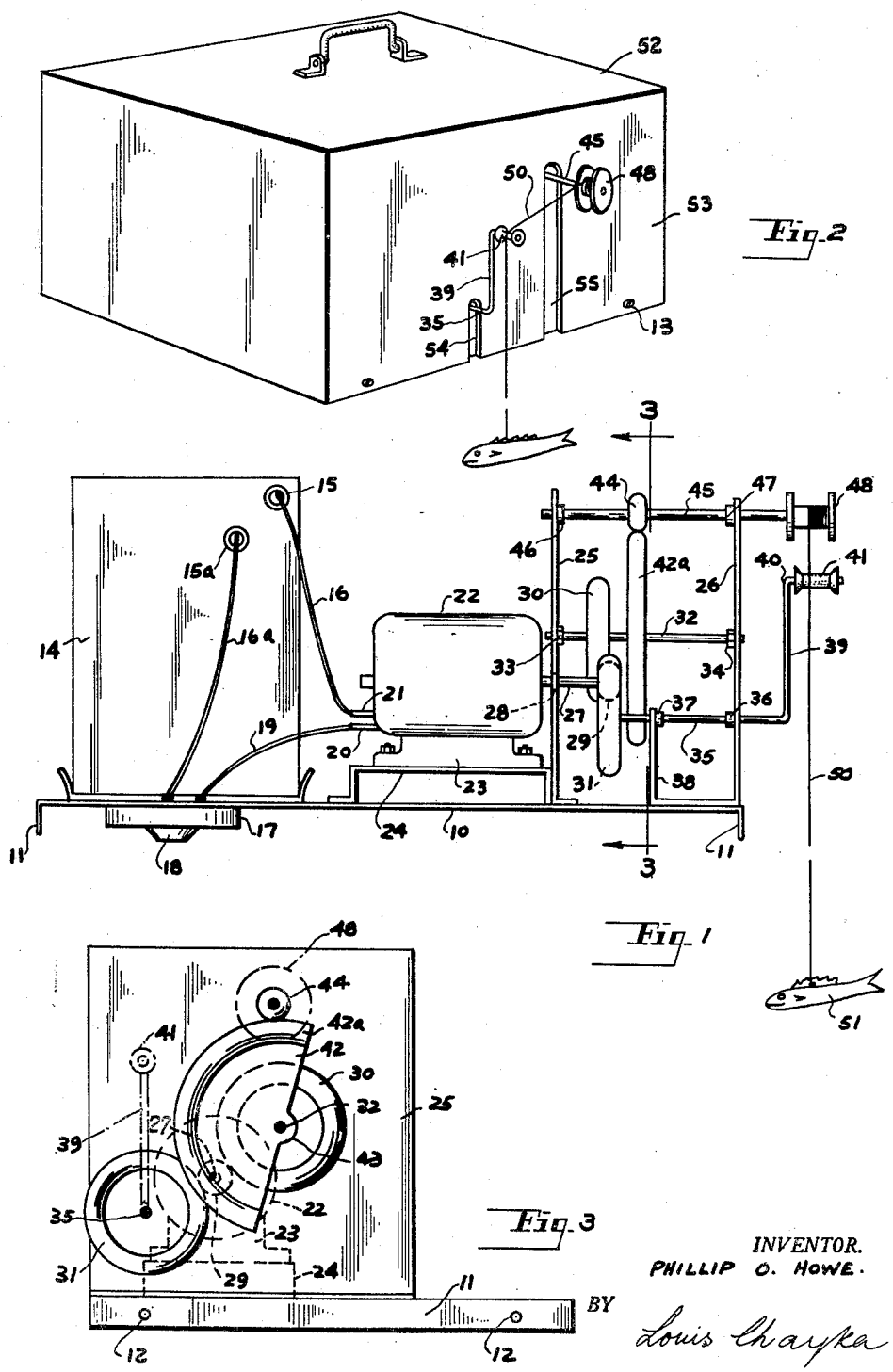
INVENTOR.
PHILLIP O. HOWE.
BY Louis Chayka
ATTORNEY.

United States Patent Office 2,707,843
Patented May 10, 1955

2,707,843

DEVICE FOR PLAYING FISH LURES

Phillip O. Howe, Pontiac, Mich.

Application May 19, 1954, Serial No. 430,881

4 Claims. (Cl. 43—26.1)

The invention pertains to a stationary device or apparatus which may be located in a boat, upon a pier, or some other analogous position, and by means of which a fish line, with a lure attached to it, may be drawn through water in which the lure is immersed. The object of the invention is to impart to the lure an erratic course and a variable speed in its movement, both for the purpose of attracting fish.

The movement of the line and the lure suspended therefrom is brought about by two elements, each of which is in engagement with the fish line but each of which pursues a different path so that the course of the movement of the lure is determined by the constantly changing positions of said elements but is different from either.

Specifically, the object of the invention is to impart to the lure a movement in consecutively different directions both horizontally and vertically. Another object of the invention is to provide a device which will be light, compact, and simple in structure, and yet fully practical for the purposes for which it has been designed.

I shall now describe my invention with reference to the accompanying drawings in which:

Fig. 1 is a side elevational view of the operative elements of the device;

Fig. 2 is a perspective view of the device as it appears in an enclosing cabinet, the view including some elements outwardly extending therefrom;

Fig. 3 is a front elevational view of the operative elements of the device on line 3—3 of Fig. 1, the view including a phantom presentation of the elements disposed between said line 3—3 and the point of view.

Similar numerals refer to similar parts throughout the several views.

The device is mounted on a flat, rectangular base 10 preferably made of sheet metal and including, at each end, a downwardly turned flange 11. Apertures 12 made therein serve for application of screws 13 to which reference will be made in the course of this specification.

Mounted upon one end portion of the platform is a casing 14 containing an electric battery of cells, dry or storage, as the case may be, the casing being provided with outlets 15 and 15a through which wires 16 and 16a, secured at one end to the terminals of the battery, are drawn outwardly. One of the wires, 16, is connected to a combined switch and rheostat 17 located on the underside of the base 10 and controlled by means of a knob 18. A return wire 19 leads from the rheostat to the terminals 20 and 21, respectively, of the electric motor 22. The latter is supported on a pillow block 23 which is mounted on a raised platform 24 upwardly spaced from said base 10.

Located forwardly of said motor are two vertical standards or plates, 25 and 26, respectively, the plates being mounted upon the base 10 in a parallel relation to each other and at right angle to the shaft 27 of the motor. The shaft passes through an aperture 28 in plate 25 and is axially secured to a small diameter friction wheel 29 which is in an operative contact with the peripheral portions of two rubber-tired wheels, 30 and 31, respectively, the wheels being diametrically opposed to each other, as shown in Fig. 3.

The first named of said wheels, 30, is mounted on an arbor 32 which is journalled at its ends in bearings 33 and 34 in plates 25 and 26, respectively, while the other wheel is mounted on one end of shaft 35 which is journalled in a bearing 36 in plate 26 and in a bearing 37 in an auxiliary standard 38. The standard may be integrally connected to plate 26, as shown in Fig. 1.

The outer portion of said shaft 35, that is, the portion remote from said wheel 31, is formed into a crank 39 terminating with a horizontal arm 40 carrying thereon a freely rotating roller 41. Mounted upon the arbor 32, for rotation therewith, is a semicircular member 42 including a hub portion 43 and provided with a rubber friction tire 42a along the full 180 degree arc of its semicircular periphery. The tire is adapted to bear against the periphery of another friction wheel 44 mounted upon another arbor 45.

The last-named arbor is journalled in bearings 46 and 47 in plates 25 and 26, respectively, and supports at one of its ends, forwardly of plate 26, a spool 48, the spool being adapted to rotate with said arbor 45. A fish line 50 is at one end wound upon said spool, while suspended therefrom at its other end is a fish lure 51.

The mechanism described herein is protected by a cover or cabinet 52. Close to its lower edge, the cover is provided with holes adapted to be in register with holes 12 in flanges 11 of the base 10 so that said cover may be secured to said flanges by means of screws 13. One wall 53 of the cover is provided with a vertical slot 54 running to the lower rim of the cover, the slot serving to receive said shaft 35, while another vertical slot 55, similarly extending to the lower rim of the cover, serves for the reception of the arbor 45 supporting said spool 48.

Because of the employement of the slots, both the spool 48 and the roller 41 may be located outside the cover, while the rest of the mechanism of the device is disposed therewithin.

The operation of the device is quite obvious:

It will be assumed, for example, that the apparatus is located upon a seat of a boat so that the spool 48 and the roller 41 will project over the side of the boat and that the motor 22 is switched off. A length of the fish line 50 which is wound on the spool 48 will be drawn over the roller 41 and let down with the lure 51 into the water to the best suitable depth for fishing.

As the motor is switched on, the small wheel 29, frictionally engaged with wheel 30, will impart a rotary movement to the semicircular member 42. This, in turn, will, during one-half of its rotation, rotate the spool 48, imparting to it a number of complete turns about its axis and causing, thereby, the fishline, with the lure, to be pulled up. Immediately, however, during the second half of the rotation of said member 42, the spool will be caused to spin in the opposite direction by the weight of the lure itself and possibly that of a sinker which may be attached to the line so that the lure will drop down to its original length.

Simultaneously, both during the winding and the unwinding of the line, said line will be moved back and forth, towards the spool and away from it, by means of said crank 39, or, more specifically, by the roller 41 carried by said crank, since the fishline extending from the spool is drawn over said roller, as shown in Fig. 1.

As the motor continues rotating, the semicircular member 42 will again cause the lure to be pulled up, only to have it dropped under the weight of the lure, as stated above.

While the specification identifies a number of friction wheels, it will be understood that equivalent means may be employed to reduce the revolutions per minute of the spool and the crank.

It will be understood that these and other changes may be made in the apparatus without stepping beyond the range of the inventive concept disclosed herein.

What I, therefore, wish to claim is as follows:

1. A horizontal shaft journalled for rotation about its axis, a spool and a friction wheel mounted on the shaft for rotation therewith, a fish line wound up at one end upon said spool and depending therefrom, the other end of the fish line adapted to support a fish lure, and a motor-driven semicircular member having an arcuate rim in engagement, during one-half of its rotary movement about its center, with said friction wheel and out of engagement therewith during the complementary one-half of its rotation to permit the line, during said last-named rotation, to unwind under the weight of the lure.

2. A horizontal shaft journalled for rotation about its axis, a spool mounted thereon for rotation therewith, a friction wheel axially keyed to the shaft, a power-driven crank including an off-center horizontal arm, the arm being disposed parallel to the first-named shaft, a fish line at one end wound upon said spool, the fish line passing over the horizontal arm of the crank and having a fish lure attached to the lower end thereof, and a power-driven semicircular member having an arcuate rim in engagement, during one-half of its rotation about its center, with said friction wheel and out of engagement therewith during the complementary half of its rotation about said center to permit it to unwind under the weight of the lure during the period of the last-named rotation.

3. A horizontal shaft mounted for rotation about its axis, a spool and a friction wheel, both being axially mounted upon the shaft in a spaced relation to each other for rotation with said shaft, an arbor mounted for rotation parallel to the above-named shaft, a semicircular member mounted upon the arbor for rotation therewith, the member having an arcuate rim for engagement with said friction wheel during one-half of the rotation of said semicircular member and out of engagement with said friction wheel during the complementary half turn of said rotation, a crank mounted for rotation and including a horizontal arm in a parallel relation to the first-named shaft, a roller upon said arm, a fish line at one end wound upon said spool, the fish line passing over the roller on the horizontal arm of the crank and having a fish lure attached to the lower end thereof, and power means to drive the first-named shaft and to rotate said crank.

4. A fish lure playing device including a horizontal spool mounted for rotation, a power-driven crank mounted for rotation about its axis and including an off-center horizontal arm, a fish line at one end wound upon said spool, the fish line passing over the horizontal arm of the crank and depending therefrom, a fish lure attached to the lower end of the fish line and power-driven means to impart to the spool, in periods, a few turns about its axis in one direction to wind up a length of said line, but allowing the line to unwind by gravity between the periods.

References Cited in the file of this patent

UNITED STATES PATENTS

| | | |
|---|---|---|
| 394,457 | Chapman | Dec. 11, 1888 |
| 2,522,412 | Tower | Sept. 12, 1950 |
| 2,643,478 | Paulsen | June 30, 1953 |